No. 836,986. PATENTED NOV. 27, 1906.
J. J. McMANMON.
PLOW SHOVEL.
APPLICATION FILED APR. 7, 1906.
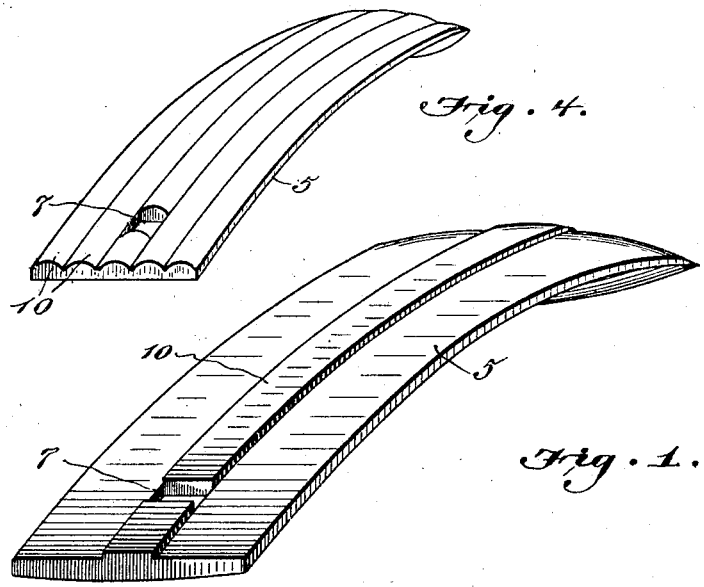
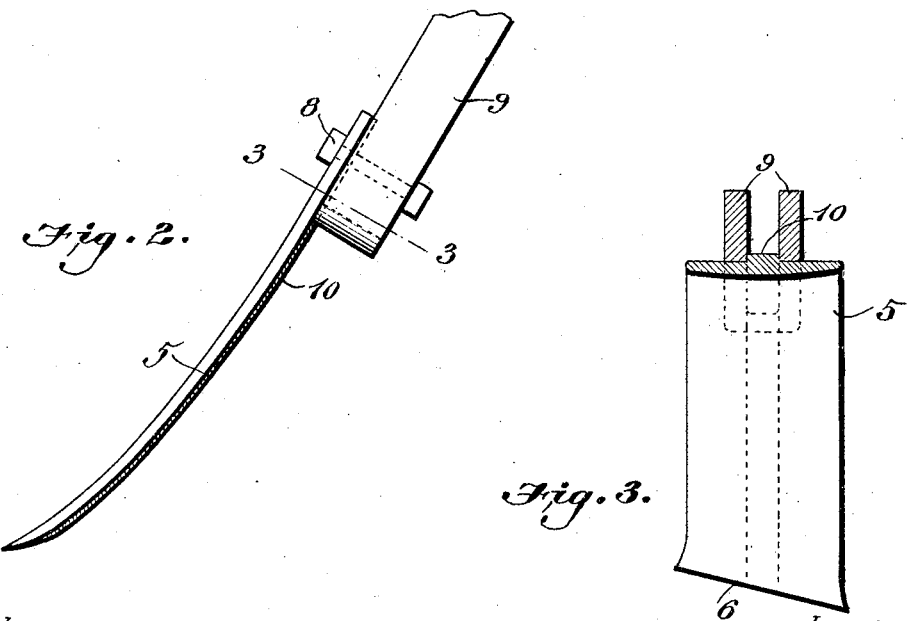
WITNESSES:
O. E. Murray.
M. A. Schmidt.
INVENTOR
John J. McManmon,
BY
Milo B. Stevens 2nd Co.
Attorneys.

UNITED STATES PATENT OFFICE.

JOHN J. McMANMON, OF IRONTON, OHIO.

PLOW-SHOVEL.

No. 836,986.

Specification of Letters Patent.

Patented Nov. 27, 1906.

Application filed April 7, 1906. Serial No. 310,494.

*To all whom it may concern:*

Be it known that I, JOHN J. McMANMON, a citizen of the United States, residing at Ironton, in the county of Lawrence and State of Ohio, have invented new and useful Improvements in Plow-Shovels, of which the following is a specification.

This invention relates to plow-shovels, and has for its object to produce an improved form of shovel, embodying increased strength and stiffness, which can be cheaply manufactured.

In the accompanying drawings, Figure 1 is a perspective view of the shovel. Fig. 2 is an elevation showing the manner in which the shovel is secured to the plow-stock. Fig. 3 is a horizontal section on the line 3 3 of Fig. 2, and Fig. 4 is a modification.

Referring specifically to the drawings, 5 indicates a shovel having a beveled cutting edge 6 at its lower end and at the opposite end a hole 7 for the bolt 8, whereby the shovel is fastened to the plow-stock. The latter comprises two spaced bars 9, which are joined at their lower ends.

On the back of the shovel is a central longitudinal rib 10, which extends the entire length of the shovel. This rib adds greatly to the strength and stiffness of the shovel, and it is therefore possible to use lighter material in the manufacture of the shovel.

When the shovel is in position on the plow-stock, the rib 10 extends and fits snugly between the two bars 9 forming the plow-stock, the portion joining the lower ends of said bars being notched to receive the rib. By extending the rib between the bars 9, as stated, the shovel is effectively secured against lateral displacement. The rib does not interfere with the vertical adjustment of the shovel on the stock.

The shovel herein described can be cheaply produced. A bar of steel of suitable length is rolled with a central rib on one side. The bar is then cut up into the desired lengths, after which the hole 7 is punched and the cutting edge 6 sharpened. In the drawings a rib is shown which is square in cross-section; but the rib can be given a triangular, oval, or other suitable cross-section.

In Fig. 4 a shovel is shown having on its back a series of parallel longitudinally-extending ribs, the cross-section of which may also be varied as heretofore stated.

I claim—

The combination with a plow-stock comprising spaced bars, of a shovel having on the back thereof a longitudinally-extending rib fitting between the bars, and means for securing the shovel to the stock.

In testimony whereof I have signed my name to this specification in the presence of two subscribing witnesses.

JOHN J. McMANMON.

Witnesses:
  ALICE CLORAN,
  O. E. IRISH.